United States Patent
Binek et al.

(10) Patent No.: US 11,021,963 B2
(45) Date of Patent: Jun. 1, 2021

(54) MONOLITHIC BODY INCLUDING AN INTERNAL PASSAGE WITH A GENERALLY TEARDROP SHAPED CROSS-SECTIONAL GEOMETRY

(71) Applicant: United Technologies Corporation, Farmington, CT (US)

(72) Inventors: Lawrence A. Binek, Glastonbury, CT (US); Jesse R. Boyer, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 82 days.

(21) Appl. No.: 16/403,122

(22) Filed: May 3, 2019

(65) Prior Publication Data
US 2020/0347728 A1 Nov. 5, 2020

(51) Int. Cl.
| | | |
|---|---|---|
| *F01D 5/08* | (2006.01) | |
| *F01D 25/18* | (2006.01) | |
| *B33Y 80/00* | (2015.01) | |
| *B33Y 10/00* | (2015.01) | |
| *B33Y 70/00* | (2020.01) | |

(52) U.S. Cl.
CPC .............. *F01D 5/087* (2013.01); *B33Y 80/00* (2014.12); *F01D 25/18* (2013.01); *B33Y 10/00* (2014.12); *B33Y 70/00* (2014.12); *F05D 2220/32* (2013.01); *F05D 2230/31* (2013.01); *F05D 2240/24* (2013.01); *F05D 2250/10* (2013.01); *F05D 2260/20* (2013.01); *F05D 2260/98* (2013.01)

(58) Field of Classification Search
CPC ......... F01D 5/087; F01D 25/18; B33Y 80/00; B33Y 10/00; B33Y 7/00; F05D 2220/32; F05D 2230/13; F05D 2240/24; F05D 2250/10
See application file for complete search history.

(56) References Cited

U.S. PATENT DOCUMENTS

| | | | | |
|---|---|---|---|---|
| 5,609,779 | A * | 3/1997 | Crow ................ | B23K 26/0622 219/121.71 |
| 6,092,982 | A * | 7/2000 | Ikeda ................ | F01D 5/186 137/806 |
| 6,942,451 | B1 | 9/2005 | Alexander et al. | |
| 7,008,186 | B2 * | 3/2006 | Heeg ................ | F01D 5/186 416/97 R |
| 7,052,231 | B2 * | 5/2006 | Wilusz .............. | F01D 11/24 415/115 |
| 7,219,490 | B2 | 5/2007 | Dev | |
| 7,780,415 | B2 * | 8/2010 | Liang ............... | F01D 5/186 416/97 R |

(Continued)

OTHER PUBLICATIONS

EP search report for EP20171095.1 dated Sep. 3, 2020.

*Primary Examiner* — Igor Kershteyn
(74) *Attorney, Agent, or Firm* — Getz Balich LLC

(57) ABSTRACT

A component is provided for a gas turbine engine. This component includes a monolithic body configured with an internal passage. The internal passage extends along a centerline within the monolithic body. The internal passage has a cross-sectional geometry perpendicular to the centerline. The cross-sectional geometry of at least a first portion of the internal passage has a teardrop shape.

19 Claims, 9 Drawing Sheets

(56) References Cited

U.S. PATENT DOCUMENTS

| | | | |
|---|---|---|---|
| 8,092,177 B2 * | 1/2012 | Liang | F01D 5/186 |
| | | | 416/96 R |
| 8,281,604 B2 * | 10/2012 | Broomer | F01D 9/04 |
| | | | 60/806 |
| 8,356,694 B2 | 1/2013 | Jones | |
| 2010/0170255 A1 | 7/2010 | Zuo | |
| 2011/0173983 A1 | 7/2011 | Pinson | |
| 2013/0280091 A1 * | 10/2013 | Propheter-Hinckley | |
| | | | B22F 3/1017 |
| | | | 416/97 A |
| 2014/0367495 A1 | 12/2014 | Monaghan | |
| 2017/0138599 A1 | 5/2017 | Baibuzenko | |
| 2018/0266692 A1 | 9/2018 | Patel | |
| 2020/0095934 A1 * | 3/2020 | Sebastian | F02C 7/16 |

* cited by examiner

MONOLITHIC BODY INCLUDING AN INTERNAL PASSAGE WITH A GENERALLY TEARDROP SHAPED CROSS-SECTIONAL GEOMETRY

BACKGROUND OF THE DISCLOSURE

1. Technical Field

This disclosure relates generally to a monolithic body with at least one internal passage and methods for forming such a monolithic body.

2. Background Information

It is known in the art to form a body with an internal passage using additive manufacturing. However, such an internal passage is typically formed with internal support structures (e.g., pedestals, webbing, etc.) in order to support a sidewall of the passage during the additive manufacturing. These internal support structures are subsequently removed from the internal passage using post formation operations. These post formation operations may be time consuming and difficult, particularly where the internal passage follows a tortuous trajectory within the body. There is a need in the art therefore for methods of forming a body with an internal passage without requiring use of internal support structures.

SUMMARY OF THE DISCLOSURE

According to an aspect of the present disclosure, a component is provided for a gas turbine engine. This component includes a monolithic body configured with an internal passage. The internal passage extends along a centerline within the monolithic body. The internal passage has a cross-sectional geometry perpendicular to the centerline. The cross-sectional geometry of at least a first portion of the internal passage has a teardrop shape.

According to another aspect of the present disclosure, another component is provided for a gas turbine engine. This component includes a monolithic body configured with an internal passage. The internal passage extends along a centerline within the monolithic body. The internal passage has a cross-sectional geometry perpendicular to the centerline. A perimeter of the cross-sectional geometry for at least a first portion of the internal passage includes a curved segment, a first straight segment and a second straight segment that meets the first straight segment at a corner. The curved segment extends circumferentially between a first curved segment end and a second curved segment end. The first straight segment extends from the corner towards the first curved segment end. The second straight segment extends from the corner towards the second curved segment end.

According to still another aspect of the present disclosure, a method is provided for forming a component for a gas turbine engine. During this method, a monolithic body configured with an internal passage is additively manufactured. The internal passage extends along a centerline within the monolithic body. The internal passage has a cross-sectional geometry perpendicular to the centerline. The cross-sectional geometry of at least a first portion of the internal passage has a teardrop shape. The internal passage may be formed during the additive manufacturing without any support structure within the first portion of the internal passage.

The teardrop shape may have a point and a center. The cross-sectional geometry of the first portion of the internal passage may be oriented such that a line extending from the center to the point is perpendicular to a build plane for the additive manufacturing.

A perimeter of the teardrop shape may include a curved segment, a first straight segment and a second straight segment that meets the first straight segment at a point. The curved segment may extend circumferentially between a first curved segment end and a second curved segment end. The first straight segment may extend from the point to the first curved segment end. The second straight segment may extend from the point to the second curved segment end.

The first straight segment may be angularly offset from the second straight segment by an angle that is equal to or less than ninety degrees.

The cross-sectional geometry of a second portion of the internal passage may have a shape that is different than the teardrop shape.

At least a first portion of the centerline may follow a curved trajectory.

A perimeter of the teardrop shape may include a curved segment, a first straight segment and a second straight segment that meets the first straight segment at a corner. The curved segment may have and extend circumferentially between a first curved segment end and a second curved segment end. The first straight segment may extend from the corner towards the first curved segment end. The second straight segment may extend from the corner towards the second curved segment end.

The first straight segment may be perpendicular to the second straight segment.

The first straight segment may be angularly offset from the second straight segment by an angle.

The angle may be an acute angle.

The cross-sectional geometry of a second portion of the internal passage may have a circular shape.

The cross-sectional geometry of a second portion of the internal passage may have a shape that is different than the teardrop shape.

At least a first portion of the centerline may follow a curved trajectory.

A first portion of the centerline may follow a straight line trajectory. A second portion of the centerline may follow a straight line trajectory. A third portion of the centerline may extend between the first portion of the centerline and the second portion of the centerline. The third portion of the centerline may follow a curved trajectory.

The monolithic body may be configured as an inlet structure for the gas turbine engine.

The monolithic body may include an inner tubular section, an outer tubular section and a vane extending radially outward from the inner tubular section to the outer tubular section. The internal passage may be within the inner tubular section, the outer tubular section and the vane.

The monolithic body may further include a hub and a strut extending radially inward from the inner tubular section to the hub. The internal passage may be within the strut and the hub.

The foregoing features and the operation of the invention will become more apparent in light of the following description and the accompanying drawings.

DETAILED DESCRIPTION

Figure 1:
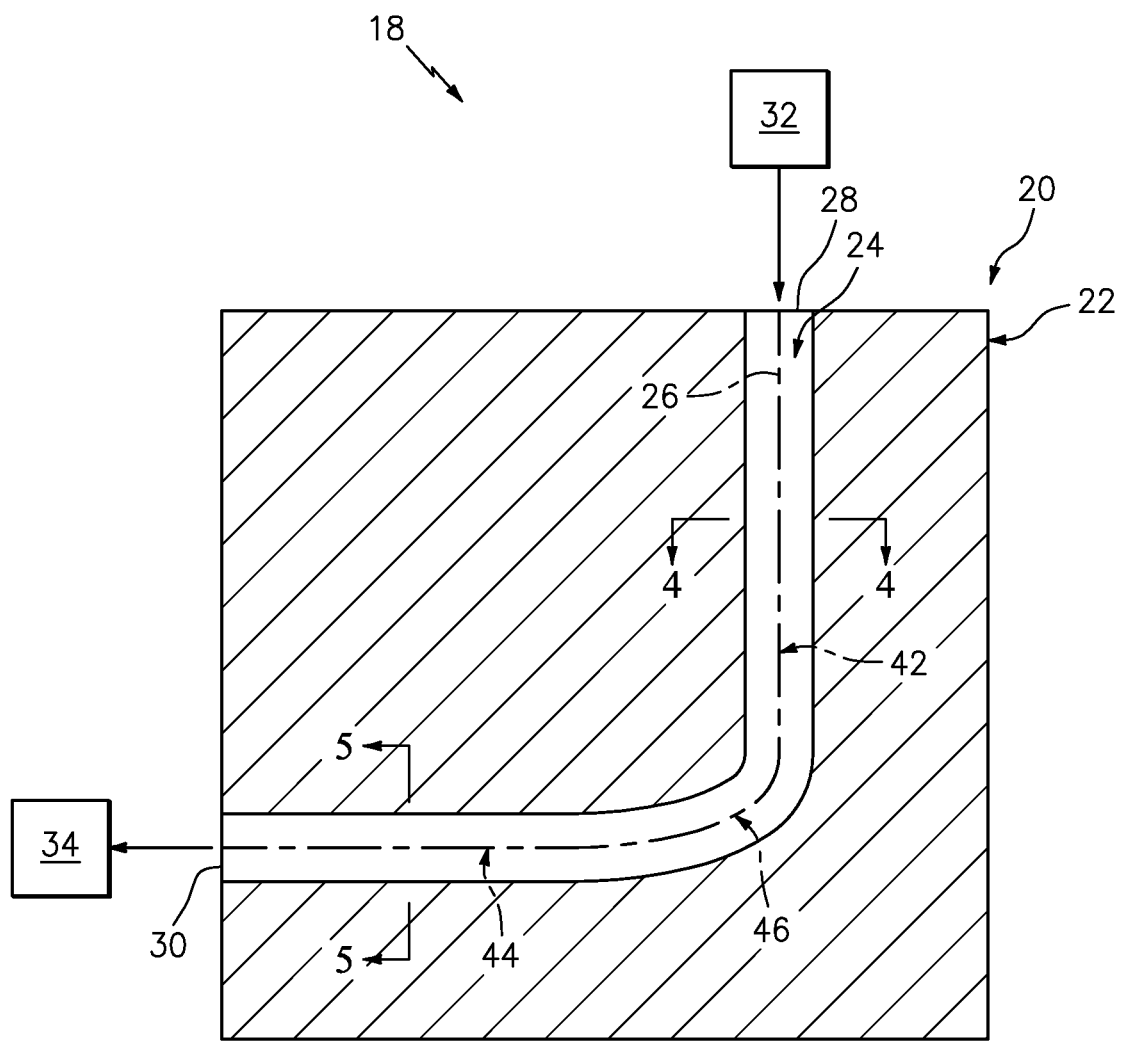
FIG. 1 is a partial schematic sectional illustration of an apparatus that includes a component with a monolithic body.

FIG. 1 is a partial schematic illustration of an apparatus 18 such as, but not limited to, a gas turbine engine. This apparatus 18 includes a component 20 configured as a monolithic body 22 with at least one internal passage 24; e.g., a fluid passage. The term "monolithic" is used herein to describe a single, unitary body formed (e.g., additively manufactured) as a single mass of material. A non-monolithic body, by contrast, includes discretely formed bodies which are mechanically fastened, bonded (e.g., welded, brazed and/or adhered) and/or otherwise attached together.

The internal passage 24 has a centerline 26, and extends along its centerline 26 at least within the monolithic body 22. For example, the internal passage 24 of FIG. 1 extends along the centerline 26 through the monolithic body 22 between opposing ends 28 and 30; e.g., an inlet and an outlet. Briefly, the inlet 28 may be fluidly coupled with a fluid source 32 of the apparatus 18 such as, but not limited to, a fluid reservoir (e.g., a tank) and/or a pump. The outlet 30 may be fluidly coupled with a fluid receptacle 34 of the apparatus 18 such as, but not limited to, a bearing. In another example, the internal passage 24 of FIG. 2 extends along the centerline 26 partially into the monolithic body 22 to, for example, a manifold or another passage 36. In still another example, the internal passage 24 of FIG. 3 extends along the centerline 26 completely (e.g., only) within the monolithic body 22 between, for example, manifolds and/or other passages 38 and 40.

Figure 2:
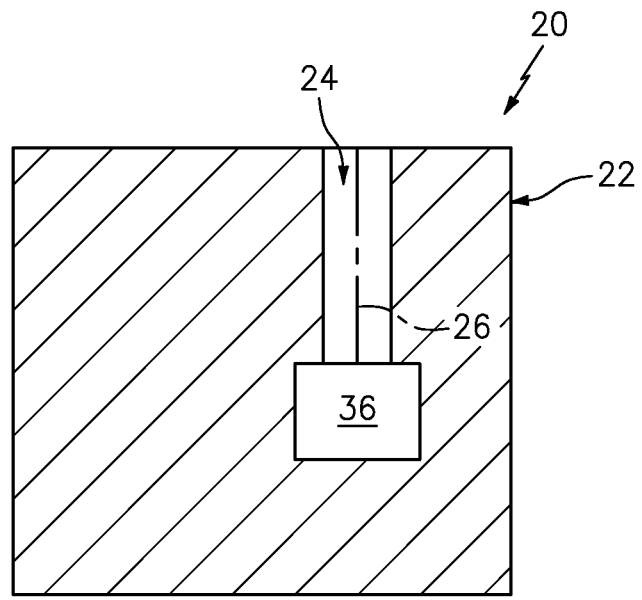
FIG. 2 is a schematic sectional illustration of another component with a monolithic body.
Figure 3:
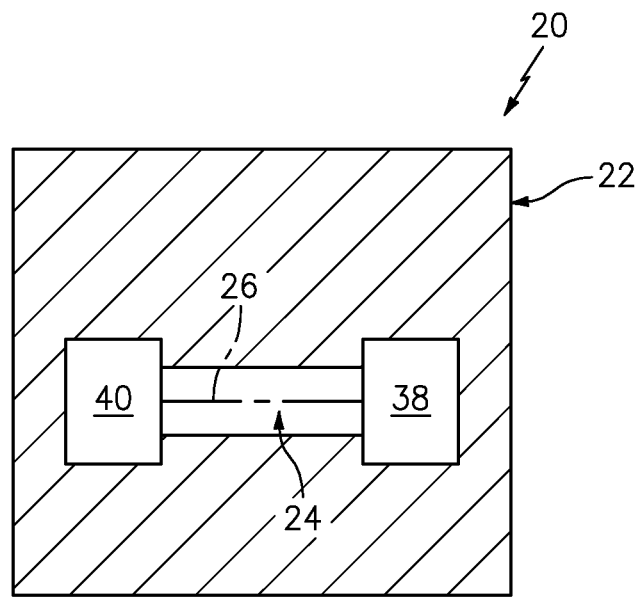
FIG. 3 is a schematic sectional illustration of another component with a monolithic body.

The centerline 26 may follow a torturous trajectory (e.g., see FIG. 1 and FIG. 8) or a straight linear trajectory (e.g., see FIGS. 2 and 3). The centerline 26 of FIG. 1, for example, includes a first portion 42, a second portion 44 and a third portion 46. The first portion 42 of the centerline 26 follows a straight line trajectory. The second portion 44 of the centerline 26 follows a straight line trajectory. The third portion 46 of the centerline 26 is and extends between the first and the second portions 42 and 44 of the centerline 26. The third portion 46 of the centerline 26 follows a curved trajectory. An example of a curved trajectory includes, but is not limited to, a trajectory that follows a spline or an arc.

Figure 4:
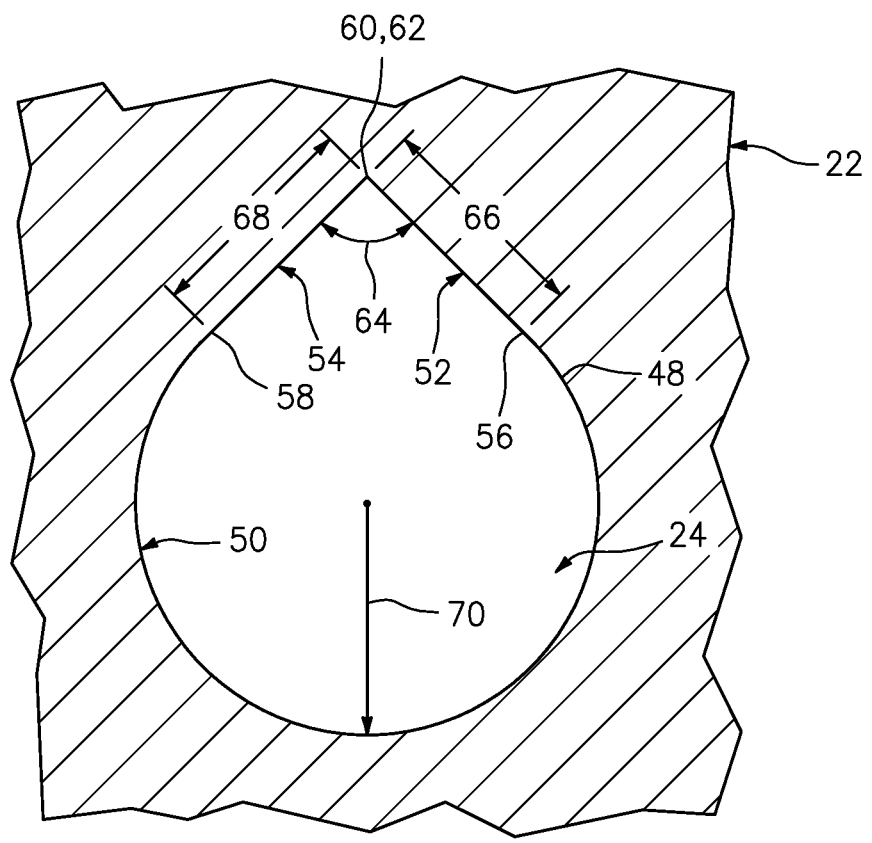
FIG. 4 is a cross-sectional illustration of an internal passage at line 4-4 in FIGS. 1 and 8.
Figure 5:
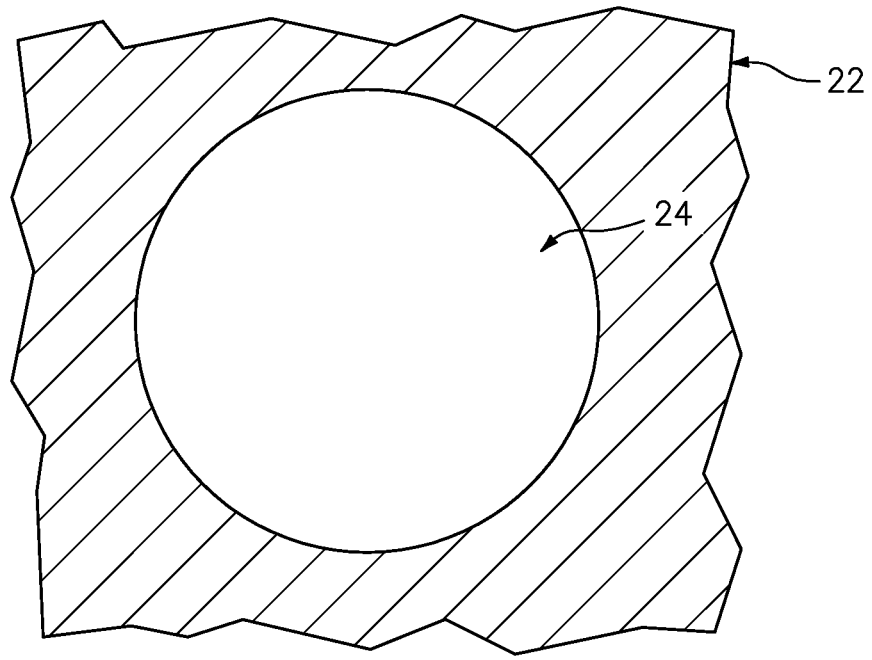
FIG. 5 is a cross-sectional illustration of the internal passage at line 5-5 in FIGS. 1 and 8.

The internal passage 24 has a cross-sectional geometry, which is viewed perpendicular to the centerline 26. An example of the cross-sectional geometry at a first location along the centerline 26 is shown in FIG. 4. An example of the cross-sectional geometry at a second location along the centerline 26 is shown in FIG. 5. As illustrated by FIGS. 1, 4 and 5, the shape of the cross-sectional geometry of the internal passage 24 may change based upon the configuration of (e.g., centerline trajectory) of the internal passage 24 as discussed below in further detail.

Figure 6:
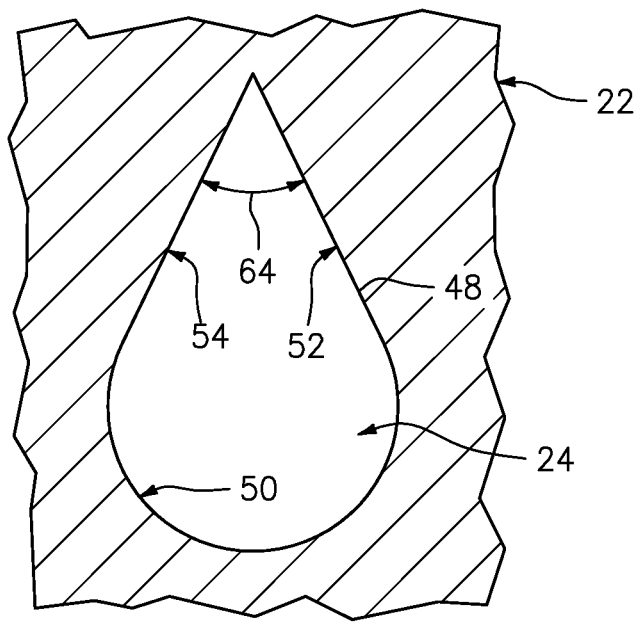
FIG. 6 is a cross-sectional illustration of another internal passage.

The cross-sectional geometry of at least a first portion of the internal passage 24 of FIG. 1 may have a teardrop shape as illustrated in FIG. 4. In particular, a perimeter 48 of the teardrop shape and, thus, the cross-sectional geometry includes a curved (e.g., arcuate, partially circular) segment 50, a first straight segment 52 and a second straight segment 54. The curved segment 50 has and extends circumferentially around the internal passage 24 between a circumferential first curved segment end 56 and a circumferential second segment end 58. The first straight segment 52 meets the second straight segment 54 at a corner 60; e.g., a point 62 of the teardrop shape. The first straight segment 52 extends from the first curved segment end 56 to the corner 60. This first straight segment 52 of FIG. 4 is also tangent to the curved segment 50 at the first curved segment end 56. The second straight segment 54 extends from the second curved segment end 58 to the corner 60. The second straight segment 54 of FIG. 4 is also tangent to the curved segment 50 at the second curved segment end 58. The second straight segment 54 is angularly offset from the first straight segment 52 by an angle 64 at the corner 60. This angle 64 may be about or exactly ninety degrees such that the first straight segment 52 is perpendicular to the second straight segment 54 as illustrated in FIG. 4. Alternatively, the angle 64 may be less than ninety degrees; e.g., the angle may be an acute angle as illustrated, for example, in FIG. 6.

Figure 7:
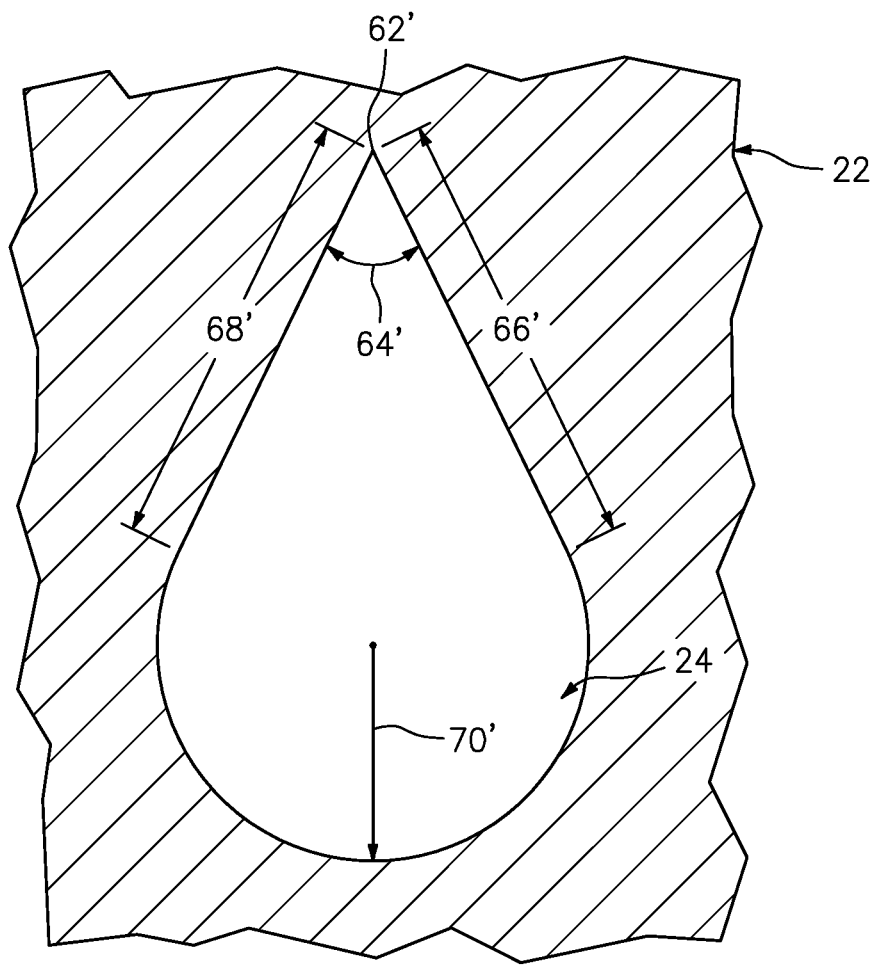
FIG. 7 is a cross-sectional illustration of another portion of the internal passage of FIG. 1.

The cross-sectional geometry of at least a second portion of the internal passage 24 of FIG. 1 may have a second shape that is different than the teardrop shape of the first portion of the internal passage 24. For example, the shape of the second portion of the internal passage 24 shown in FIG. 5 is circular. The present disclosure, however, is not limited to such an exemplary alternative shape. For example, in other embodiments, the shape of the second portion may be oval or polygonal (e.g., square or rectangular). Referring to FIG. 7, in still other embodiments, the shape of the second portion may also be teardrop shaped, but may have an angle 64' at its point 62' different (e.g., less) than the angle 64 of FIG. 4, may have straight segment lengths 66' and 68' different (e.g., longer or shorter) than the straight segment lengths 66 and 68 of FIG. 4 and/or may have a curved segment diameter 70' different (e.g., less or greater) than the curved segment diameter 70 of FIG. 4.

Figure 8:
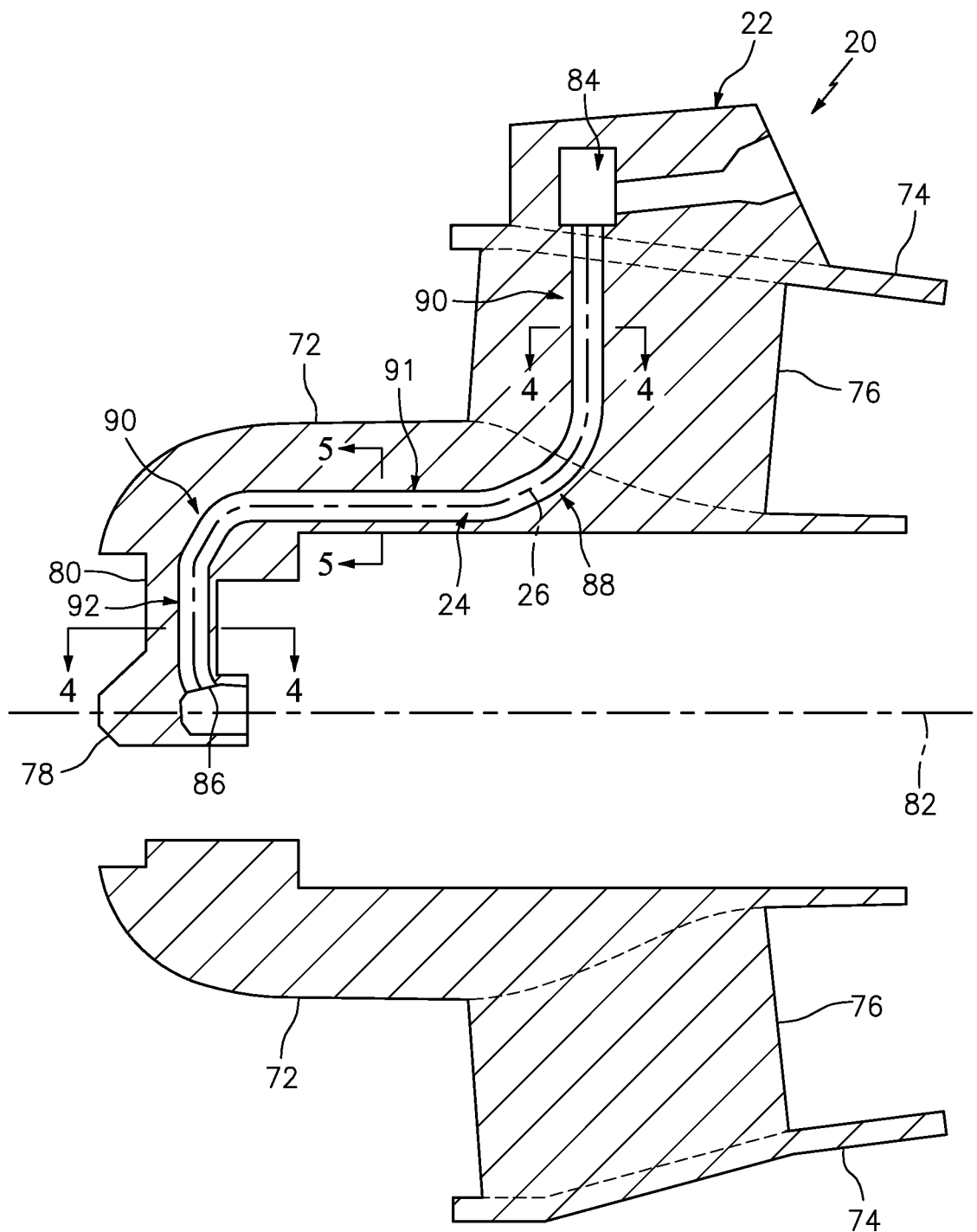
FIG. 8 is a sectional illustration of still another component with a monolithic body.

FIG. 8 illustrates a sectional illustration of another exemplary embodiment of the monolithic body 22. In this embodiment, the monolithic body 22 is configured as an inlet structure for a gas turbine engine. The monolithic body 22 of FIG. 8, for example, includes an inner tubular section 72, an outer tubular section 74 and one or more vanes 76. The monolithic body 22 of FIG. 8 also includes a hub 78 and one or more struts 80 (one visible in the view of FIG. 8).

The hub 78 may be positioned on (e.g., co-axial with) a rotational axis 82 of the apparatus 18 (e.g., a gas turbine engine) and within the inner tubular section 72. The inner tubular section 72 thereby circumscribes and completely (or partially) axially overlaps the hub 78. The struts 80 are arranged circumferentially about the rotational axis 82 in a circumferential array. Each of these struts 80 is connected to and extends radially between the hub 78 and the inner tubular section 72 thereby structurally tying the hub 78 to the inner tubular section 72. A forward axial end of the hub 78 may be axially aligned with a forward axial end of the inner tubular section 72; however, the present disclosure is not limited to such an alignment or relative hub position.

The inner tubular section 72 may also be position on (e.g., co-axial with) the rotational axis 82 and within the outer tubular section 74. The outer tubular section 74 thereby circumscribes and partially (or completely) axially overlaps the inner tubular section 72. The vanes 76 are arranged circumferentially about the rotational axis 82 in a circumferential array. Each vane 76 may be configured as a structural guide vane and, thus, may be configured as both a support strut and an airfoil; however, the present disclosure is not limited to such a dual function vane configuration. Each of the vanes 76 is connected to and extends radially between the inner tubular section 72 and the outer tubular section 74 thereby structurally tying the inner tubular section 72 to the outer tubular section 74. A forward axial end portion of the outer tubular section 74 may axially overlap an aft axial end portion of the inner tubular section 72; however, the present disclosure is not limited to such relative positions.

In the embodiment of FIG. 8, the internal passage 24 is disposed in one or more of the sections 72, 74, 76, 78 and/or 80 of the monolithic body 22. For example, the internal passage 24 of FIG. 8 extends sequentially through the outer tubular section 74, a respective one of the vanes 76, the inner tubular section 72, a respective one of the struts 80 and into the hub 78. The internal passage 24 is thereby operable to direct fluid (e.g., lubricant and/or coolant) from an arcuate or annular manifold 84 to an orifice 86 (e.g., outlet) in the hub 78. Notably, the centerline 26 of this internal passage 24 follows a tortuous trajectory. The internal passage 24 also includes curved/radiused corners 88 and 90 (opposed to angled corners; e.g., sharp elbows) between its substantially straight legs 92-94. These curve corners 88 and 90 enable fluid to flow with less turbulence through the internal passage 24 as compared to an internal passage with one or more angled (e.g., 45 or 90 degree) corners.

One or more portions of the internal passage 24 of FIG. 8 may each have a teardrop shaped cross-sectional geometry as described above and illustrated in, for example, FIG. 4. At least another portion of the internal passage 24 of FIG. 8 may have an alternatively shaped cross-sectional geometry as described above and illustrated in, for example, FIG. 5. Alternatively, the entire internal passage 24 may have a constant or varying teardrop shaped cross-sectional geometry.

Figure 9:
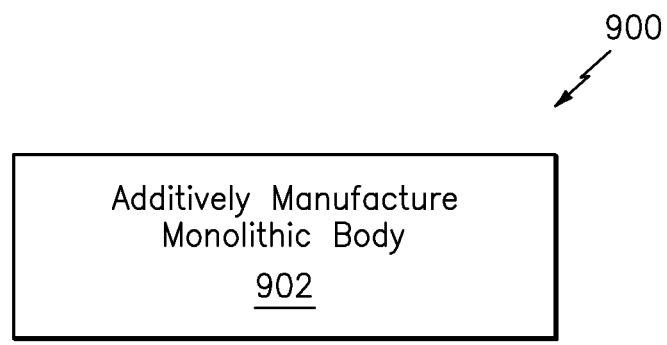
FIG. 9 is a flow diagram of a method for additively manufacturing a monolithic body with an internal passage.

FIG. 9 is a flow diagram of a method 900 for providing (e.g., forming, manufacturing) a component such as any one of the components 20/monolithic bodies described above and illustrated in FIGS. 1-8. However, for ease of description, the method 900 is described below with reference to provide a component such as the monolithic body 22 of FIG. 1.

In step 902, the monolithic body 22 is additively manufactured. The term "additive manufacturing" may describe a process where a part or parts are formed by accumulating and/or fusing material together, typically in a layer-on-layer manner. Layers of powder material, for example, may be disposed and thereafter solidified sequentially onto one another to form the part(s). The term "solidify" is used herein to describe a process whereby material is sintered and/or otherwise melted thereby causing discrete particles or droplets of the sintered and/or melted material to fuse together.

During the additive manufacturing step 902, the monolithic body 22 may be formed layer-by-layer using an additive manufacturing system. Examples of an additive manufacturing system include, but are not limited to, Powder Bed Fusion processes using Laser and/or Electron Beam power sources and various Directed Energy Deposition systems that may use wire or blown powder materials and Laser, Electron Beam, or other electrical power sources.

Figure 10:
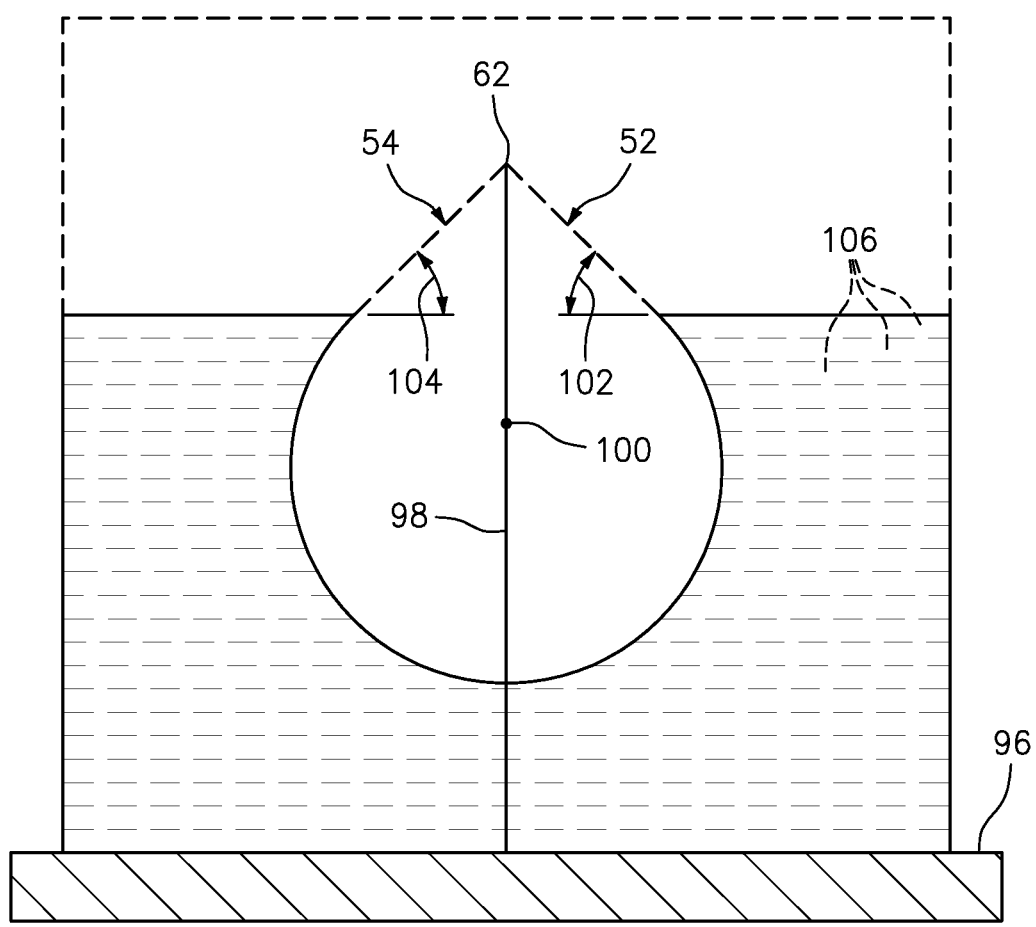
FIG. 10 is a schematic sectional illustration of the component of FIG. 1 during additive manufacturing.

During the additive manufacturing of the monolithic body 22, the entire internal passage 24, or at least the portion (e.g., at least the first portion) of the internal passage 24, with the teardrop shaped cross-sectional geometry may be formed without any internal support structures within the passage 24. For example, the cross-sectional geometry of the internal passage 24 may be configured (e.g., oriented) such that the point 62 of the teardrop shape always points up relative to a build plane 96 of the additive manufacturing system as shown, for example, in FIG. 10. With this configuration, a line 98 extending from a center 100 of the teardrop shape to its point 62 is perpendicular to the build plane 98. The angle 102, 104 between each straight segment 52, 54 and the build plane 98 may thereby be no more than forty-five degrees. As a result, each layer 106 of material being solidified during the additive manufacturing process may be fully supported by the previously solidified layer without requiring an additional support structure. This configuration would eliminate the need for traditional support material. This structure may not initially be intuitive, but would require various iterations considering orientation, geometry, and machine capabilities. The monolithic body 22 may therefore be additively manufactured and its internal passage 24 may be formed without requiring post additive manufacturing processes for removing internal support structures.

In some embodiments, the monolithic body 22 may be formed (e.g., additively manufactured) from metal such as, but not limited to, aluminum (Al), copper (Cu), titanium (Ti), nickel (Ni), vanadium (V), chromium (Cr), iron (Fe) and/or alloys of one or more of the foregoing metals. Some of these alloys are commonly referred to as UNS N07718, UNS N06625, Ti-6Al-4V, Ti-6Al-4V ELI, AlSi10Mg, etc. In other embodiments, the monolithic body 22 may be formed (e.g., additively manufactured) from other materials such as, but not limited to, ceramic and polymer.

The method 900 of FIG. 9 may include one or more additional steps other than that described above. For example, the monolithic body 22 may undergo additional manufacturing processes during and/or after the material buildup step 902. Examples of such additional manufacturing processes may include, but are not limited to, machining, surface finishing, coating, etc. exterior and/or interior surfaces of the monolithic body 22.

Figure 11:
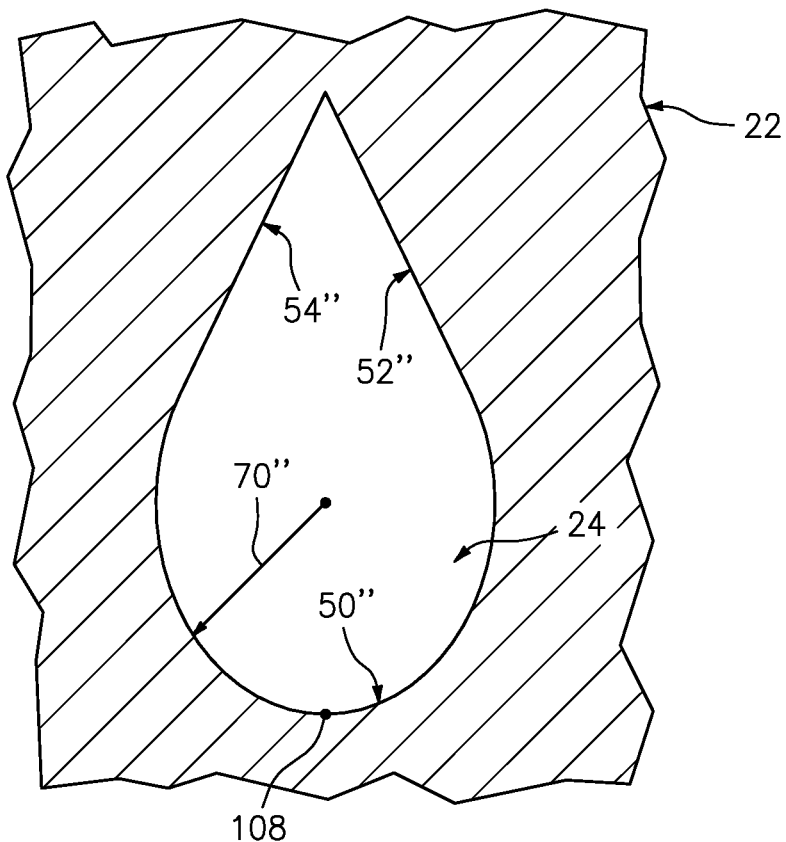
FIGS. 11 and 12 are schematic sectional illustrations of internal passages with alternative teardrop cross-sectional geometries.
Figure 12:
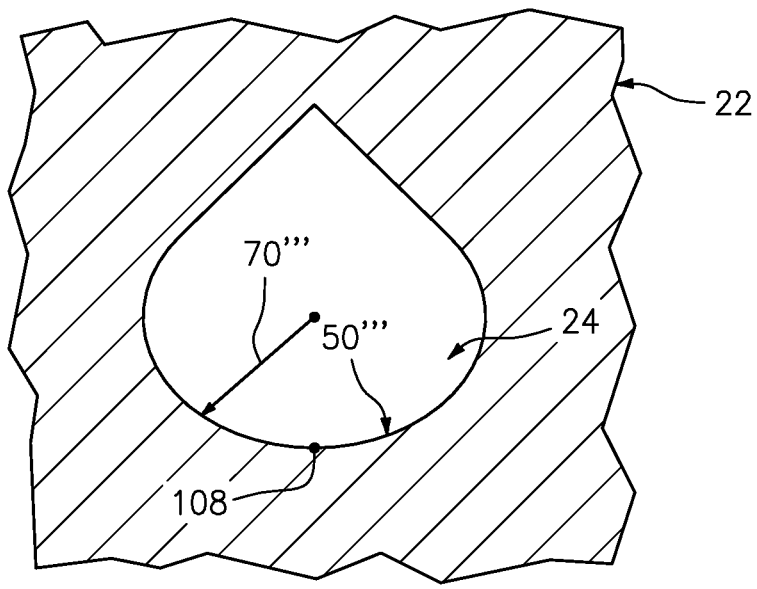

The perimeter 48 of the teardrop shape of FIG. 4 is described above as including the curved segment 50, the first straight segment 52 and the second straight segment 54. The present disclosure, however, is not limited to such an exemplary teardrop shape. For example, in other embodiments, the teardrop shape may be an elongated teardrop shape. The curved segment 50", 50''' of the teardrop shape, for example, may include a variable radius 70", 70''' of curvature as illustrated in FIGS. 11 and 12. In the embodiment of FIG. 11, the radius 70" of curvature of the curved segment 50" increases as that curved segment 50" extends towards the straight segments 52" and 54"; e.g., away from a center 108 of the curved segment 50". In the embodiment of FIG. 12, the radius 70''' of curvature of the curved segment 50 increased as that curved segment 50''' extends away from the straight segments 52''' and 54'''; e.g., towards the center 108 of the curved segment 50'''.

Figure 13:
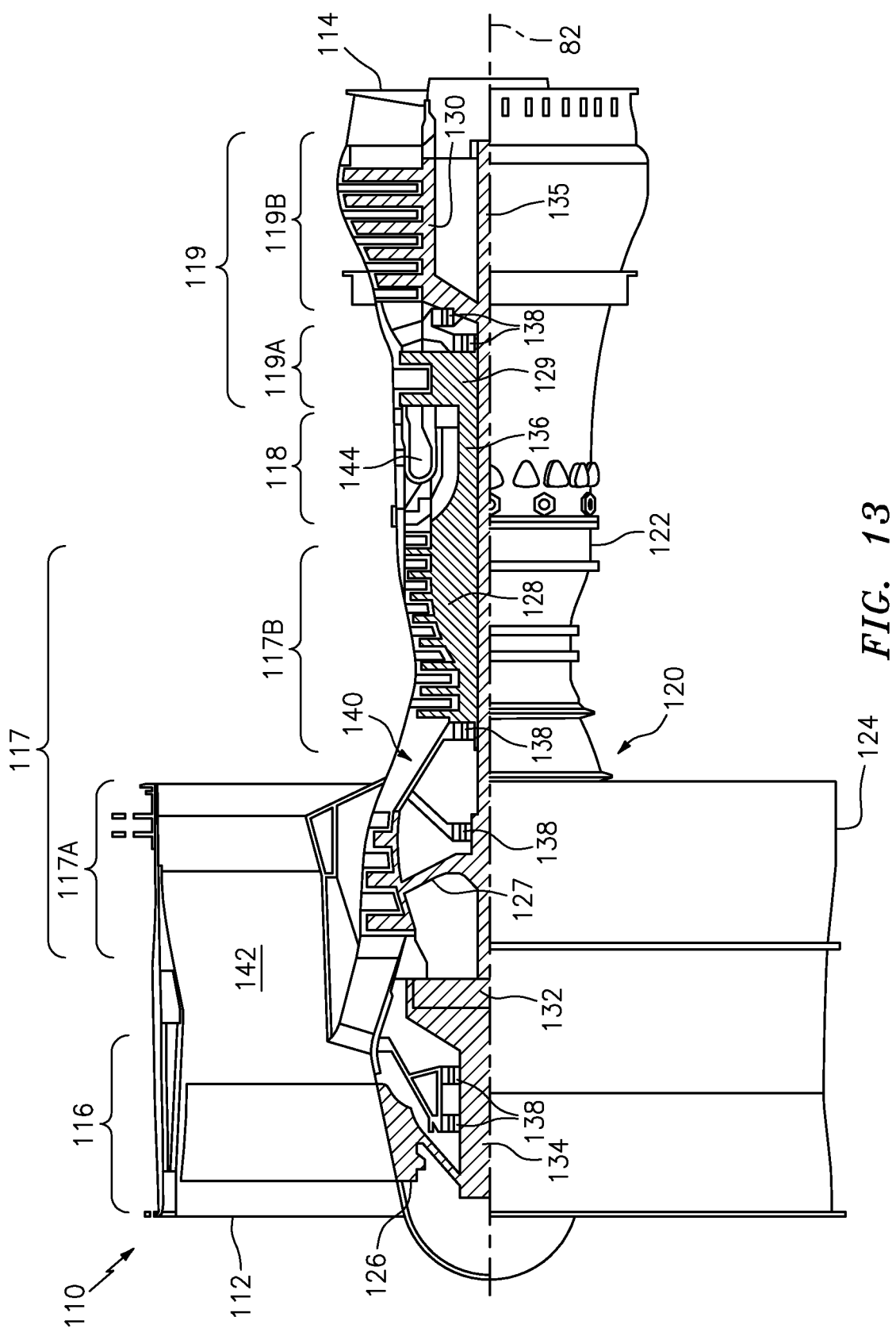
FIG. 13 is a side cutaway illustration of a gas turbine engine.

FIG. 13 is a side cutaway illustration of a geared gas turbine engine 110 with which the monolithic body 22 may be configured. This turbine engine 110 extends along a rotational axis 82 between an upstream airflow inlet 112 and a downstream airflow exhaust 114. The turbine engine 110 includes a fan section 116, a compressor section 117, a combustor section 118 and a turbine section 119. The compressor section 117 includes a low pressure compressor (LPC) section 117A and a high pressure compressor (HPC) section 117B. The turbine section 119 includes a high pressure turbine (HPT) section 119A and a low pressure turbine (LPT) section 119B.

The engine sections 116-119 are arranged sequentially along the axis 82 within an engine housing 120. This housing 120 includes an inner case 122 (e.g., a core case) and an outer case 124 (e.g., a fan case). The inner case 122 may house one or more of the engine sections 117-119 (e.g., the engine core). The outer case 124 may house at least the fan section 116.

Each of the engine sections 116, 117A, 117B, 119A and 119B includes a respective rotor 126-130. Each of these rotors 126-130 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 126 is connected to a gear train 132, for example, through a fan shaft 134. The gear train 132 and the LPC rotor 127 are connected to and driven by the LPT rotor 130 through a low speed shaft 135. The HPC rotor 128 is connected to and driven by the HPT rotor 129 through a high speed shaft 136. The shafts 134-136 are rotatably supported by a plurality of bearings 138; e.g., rolling element and/or thrust bearings. Each of these bearings 138 is connected to the engine housing 120 by at least one stationary structure such as, for example, an annular support strut.

During operation, air enters the turbine engine 110 through the airflow inlet 112. This air is directed through the fan section 116 and into a core gas path 140 and a bypass gas path 142. The core gas path 140 extends sequentially through the engine sections 117A-119B. The air within the core gas path 140 may be referred to as "core air". The bypass gas path 142 extends through a bypass duct, which bypasses the engine core. The air within the bypass gas path 142 may be referred to as "bypass air".

The core air is compressed by the compressor rotors 127 and 128 and directed into a combustion chamber 144 of a combustor in the combustor section 118. Fuel is injected into the combustion chamber 144 and mixed with the compressed core air to provide a fuel-air mixture. This fuel-air mixture is ignited and combustion products thereof flow through and sequentially cause the turbine rotors 129 and 130 to rotate. The rotation of the turbine rotors 129 and 130 respectively drive rotation of the compressor rotors 128 and 127 and, thus, compression of the air received from a core airflow inlet. The rotation of the turbine rotor 130 also drives rotation of the fan rotor 126, which propels bypass air through and out of the bypass gas path 142. The propulsion of the bypass air may account for a majority of thrust generated by the turbine engine 110, e.g., more than seventy-five percent (75%) of engine thrust. The turbine engine 110 of the present disclosure, however, is not limited to the foregoing exemplary thrust ratio.

The monolithic body 22 may be included in various turbine engines other than the one described above as well as in other types of rotational equipment. The monolithic body 22, for example, may be included in a geared turbine engine where a gear train connects one or more shafts to one or more rotors in a fan section, a compressor section and/or any other engine section. Alternatively, the monolithic body 22 may be included in a turbine engine configured without a gear train. The monolithic body 22 may be included in a geared or non-geared turbine engine configured with a single spool, with two spools (e.g., see FIG. 13), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A component for a gas turbine engine, the component comprising:
   a monolithic body configured with an internal passage;
   the internal passage extending along a centerline within the monolithic body;
   the internal passage having a cross-sectional geometry perpendicular to the centerline; and
   the cross-sectional geometry of at least a first portion of the internal passage having a teardrop shape; and
   at least a first portion of the centerline following a curved trajectory.

2. The component of claim 1, wherein
   a perimeter of the teardrop shape comprises a curved segment, a first straight segment and a second straight segment that meets the first straight segment at a corner;
   the curved segment has and extends circumferentially between a first curved segment end and a second curved segment end;
   the first straight segment extends from the corner towards the first curved segment end; and
   the second straight segment extends from the corner towards the second curved segment end.

3. The component of claim 2, wherein the first straight segment is perpendicular to the second straight segment.

4. The component of claim 2, wherein the first straight segment is angularly offset from the second straight segment by an angle.

5. The component of claim 4, wherein the angle is an acute angle.

6. The component of claim 1, wherein the cross-sectional geometry of a second portion of the internal passage has a circular shape.

7. The component of claim 1, wherein the cross-sectional geometry of a second portion of the internal passage has a shape that is different than the teardrop shape.

8. The component of claim 1, wherein
a second portion of the centerline follows a straight line trajectory;
a third portion of the centerline follows a straight line trajectory; and
the first portion of the centerline extends between the second portion of the centerline and the third portion of the centerline.

9. The component of claim 1, wherein the monolithic body is configured as an inlet structure for the gas turbine engine.

10. A component for a gas turbine engine, the component comprising:
a monolithic body configured with an internal passage;
the internal passage extending along a centerline within the monolithic body;
the internal passage having a cross-sectional geometry perpendicular to the centerline;
the cross-sectional geometry of at least a first portion of the internal passage having a teardrop shape;
the monolithic body including an inner tubular section, an outer tubular section and a vane extending radially outward from the inner tubular section to the outer tubular section; and
the internal passage within the inner tubular section, the outer tubular section and the vane.

11. The component of claim 10, wherein
the monolithic body further includes a hub and a strut extending radially inward from the inner tubular section to the hub; and
the internal passage is within the strut and the hub.

12. A component for a gas turbine engine, the component comprising:
a monolithic body configured with an internal passage;
the internal passage extending along a centerline within the monolithic body;
the internal passage having a cross-sectional geometry perpendicular to the centerline;
a perimeter of the cross-sectional geometry for at least a first portion of the internal passage including a curved segment, a first straight segment and a second straight segment that meets the first straight segment at a corner;
the curved segment extending circumferentially between a first curved segment end and a second curved segment end;
the first straight segment extending from the corner towards the first curved segment end; and
the second straight segment extending from the corner towards the second curved segment end.

13. A method for forming a component for a gas turbine engine, the method comprising:
additively manufacturing a monolithic body configured with an internal passage;
wherein the internal passage extends along a centerline within the monolithic body;
wherein the internal passage has a cross-sectional geometry perpendicular to the centerline; and
wherein the cross-sectional geometry of at least a first portion of the internal passage has a teardrop shape.

14. The method of claim 13, wherein the internal passage is formed during the additive manufacturing without any support structure within the first portion of the internal passage.

15. The method of claim 13, wherein
the teardrop shape has a point and a center; and
the cross-sectional geometry of the first portion of the internal passage is oriented such that a line extending from the center to the point is perpendicular to a build plane for the additive manufacturing.

16. The method of claim 13, wherein
a perimeter of the teardrop shape comprises a curved segment, a first straight segment and a second straight segment that meets the first straight segment at a point;
the curved segment extends circumferentially between a first curved segment end and a second curved segment end;
the first straight segment extends from the point to the first curved segment end; and
the second straight segment extends from the point to the second curved segment end.

17. The method of claim 16, wherein the first straight segment is angularly offset from the second straight segment by an angle that is equal to or less than ninety degrees.

18. The method of claim 13, wherein the cross-sectional geometry of a second portion of the internal passage has a shape that is different than the teardrop shape.

19. The method of claim 13, wherein at least a first portion of the centerline follows a curved trajectory.

* * * * *